Feb. 6, 1934.   O. M. DAVIS   1,946,455
REEL CLAMP
Filed Oct. 7, 1931

INVENTOR
Oliver M. Davis
BY
ATTORNEYS

Patented Feb. 6, 1934

1,946,455

UNITED STATES PATENT OFFICE

1,946,455

REEL CLAMP

Oliver M. Davis, Rome, N. Y., assignor to General Cable Corporation, New York, N. Y., a corporation of New Jersey Application October 7, 1931. Serial No. 567,333

6 Claims. (Cl. 242—130)

This invention relates to clamps for stranding or other machines in which reels or spools of suitable material are mounted upon supporting spindles for rotation at high speeds. In such machines it is necessary to securely and safely clamp the reel on the spindle so that there is no possibility of its flying off during operation.

An object of this invention is to provide a reel clamp for spindles constructed and arranged so as to have no loose or detachable parts, and operable to securely clamp a reel in place or to release the same without requiring the use of tools of any kind.

Figure 1:
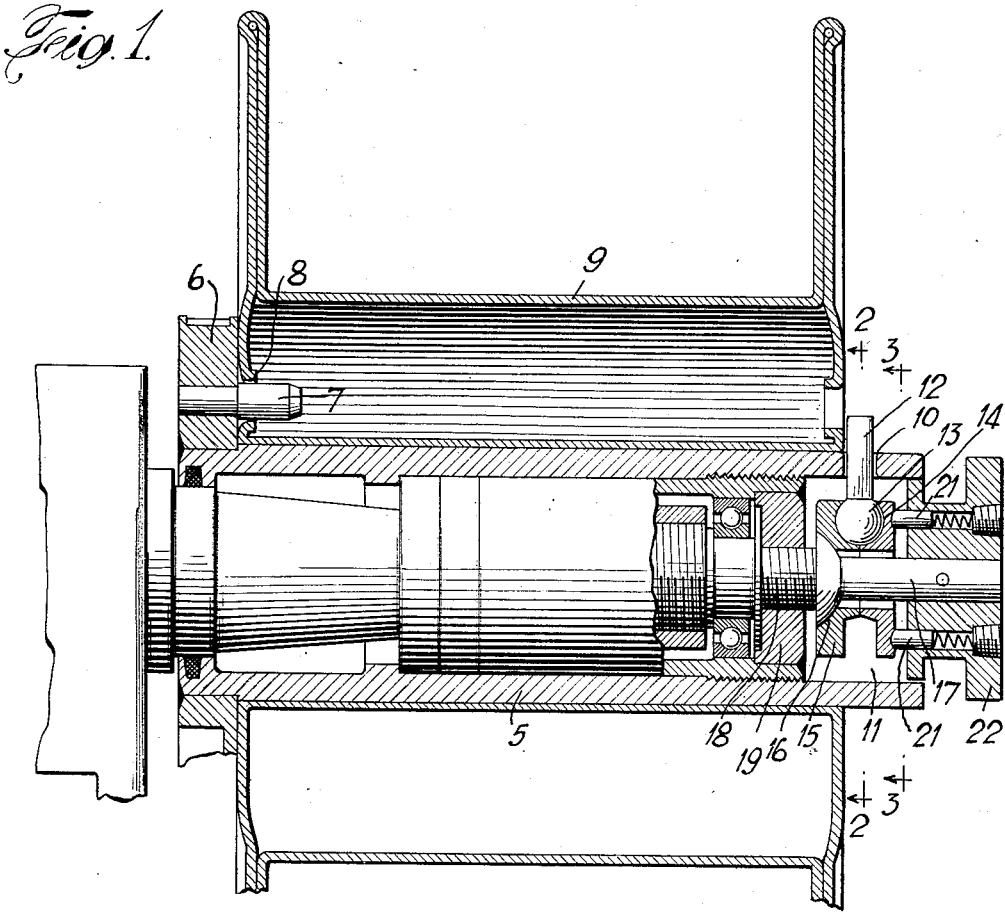

This and other objects which will be apparent to those skilled in this particular art are accomplished by means of the invention illustrated in the accompanying drawing in which, Fig. 1 is a transverse sectional view of a reel clamp constructed in accordance with one embodiment of this invention, the clamp being shown in operative association with a supporting spindle and reel mounted thereon.

Figure 2:
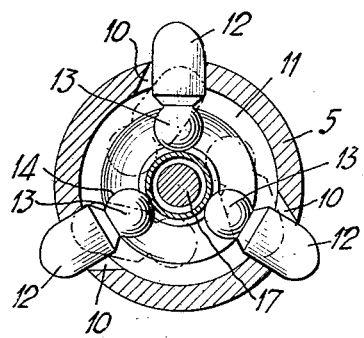
Figure 3:
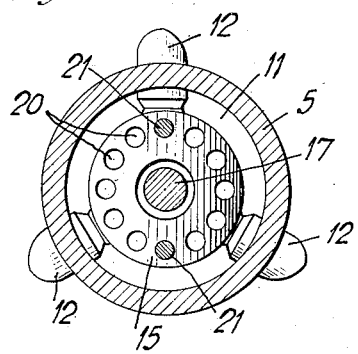

Figs. 2 and 3 are transverse sectional views on the lines 2—2 and 3—3, respectively, of Fig. 1.

The particular embodiment of the present invention which has been chosen for the purposes of illustration is shown in connection with a supporting rotatable spindle 5 having the usual face plate 6 and driving pins 7 for engaging suitable pin receiving openings 8 in the reel 9 which may be of any desired form and which is placed upon the spindle and adapted to be clamped in position against the face plate 6 by means of the reel clamp provided by the present invention.

The outer end of the spindle has a series of circumferentially spaced openings 10, preferably three in number, communicating with a chamber 11 within the spindle end. Reel clamping fingers 12 are adapted to be extended through the openings into reel clamping position or to be retracted within the openings to inoperative position. The inner end of each finger is formed as a ball 13 held in a pocket 14 of a pin supporting collar 15 flexibly supported by a ball and socket joint 16 on a collar operating shaft 17 having its inner end 18 threaded to an associated supporting member 19 forming a part of the spindle.

The outer face of the finger supporting collar 15 has a circular series of detent holes 20 co-operating with diametrically opposed spring pressed detents 21 supported in an actuator 22 secured to the outer end of the shaft 17 and accessible to the operator.

In operation, it will be apparent that rotation of the collar 15 relatively to the spindle 5 will cause the inner ends of the reel clamping fingers to move circumferentially, as indicated in dotted lines in Fig. 2, retracting the fingers to the inoperative position, whereas return of the collar 15 to the original position will cause the fingers to be extended into operative position. The openings 10 and fingers 12 are so shaped as to limit the rotation of the collar 15 so that when the fingers are extended outwardly in a radial direction further movement of the collar 15 is prevented. The collar is rotated by operation of the actuator 22 through the friction detent pins 21. When the actuator has been rotated so as to extend the fingers into operative position wherein the further movement of the collar 15 is prevented by the fingers binding in the openings 10, further rotation of the actuator 22 causes the detents 21 to slip relatively to the collar 15, rotating the shaft 17 in such a way that the threads 18 move it to the right as shown in Fig. 1, longitudinally of the spindle 5. This shifts the collar 15 outwardly, causing the fingers to cam against the outer edge of the associated openings 10 and force the outer ends of the fingers against the reel to positively clamp the same against the opposed face plate 6. In removing the reel, rotation of the actuator 22 in the proper direction first shifts the shaft 17 to the left as shown in Fig. 1, the binding pressure of the fingers on the reel and against the sides of the slots being such as to cause the detent pins 21 to slip. Rotation of the shaft 17 causes it to shift to the left and move the collar 15 to the left so as to free the fingers from their binding engagement with the reel. Thereupon the detents engage in the openings 20 and rotate the collar 15 so as to withdraw the pins to inoperative position.

It is preferable to employ three clamping fingers 12, although any desired number may be used. However, when three fingers are provided the ball and socket joint 16 permits them to accommodate themselves to different reels somewhat in the manner of a tripod so that each finger bears thereon equally.

The arrangement is such that the reel can be clamped in position on a spindle or instantly released therefrom without requiring the use of any tools of any kind. The operation is rapid so as to materially lessen the time required for changing reels and the result is a reduction in the cost of operation of the machine.

I claim as my invention:—

1. A reel clamp for spindles comprising reel engaging fingers extending outward from said spindle, means for causing the reel engaging portions of said fingers to move longitudinally of said spindle to clamp or release an associated reel, and means for retracting said fingers within the circumference of said spindle.

2. In combination a reel supporting spindle, reel engaging and locking fingers associated therewith, operating means for projecting said fingers outwardly to hold a reel on said spindle or for retracting said fingers to permit removal of the reel from said spindle and means for causing said fingers to press axially of the spindle against a reel when extended.

3. In combination, a spindle arranged to support a reel or the like, a reel clamp comprising reel engaging fingers supported by said spindle, means adapted to retract said fingers to inoperative position or to extend said fingers to operative position, said means being arranged to cause said fingers to move longitudinally of said spindle into and out of reel clamping position when in operative position.

4. In combination, a spindle adapted to support a reel or the like, a reel clamp supported on said spindle and including reel engaging fingers, a flexibly mounted support for said fingers arranged to permit said fingers to bear evenly against an associated reel, means for moving said support circumferentially relatively to said spindle to expand said fingers into operative reel holding position or to contract said fingers to inoperative position to release an associated reel, and means for moving said support longitudinally of said spindle to cause said fingers to clamp or release a reel.

5. In combination, a spindle adapted to support a reel or the like, a reel clamp supported on said spindle and including reel engaging fingers, a flexibly mounted support for said fingers arranged to permit said fingers to bear evenly against an associated reel including a finger supporting collar, a collar supporting shaft threaded to said spindle for longitudinal movement with relation thereto, means for rotating said shaft to move said collar longitudinally of said spindle and friction means for rotating said collar relatively to said spindle to expand or contract said fingers.

6. In combination, a spindle adapted to support a reel or the like and provided with a series of circumferentially spaced openings, a reel clamp supported on said spindle and including reel engaging fingers extending through said openings, a flexibly mounted support for said fingers arranged to permit said fingers to bear evenly against an associated reel including a finger supporting collar, a collar supporting shaft threaded to said spindle for longitudinal movement with relation thereto, a manually operated actuator secured to said shaft for rotating said shaft to move said collar longitudinally of said spindle and friction means between said actuator and said collar for rotating said collar relatively to said spindle to expand or contract said fingers.

OLIVER M. DAVIS.